United States Patent
Faust et al.

(10) Patent No.: US 6,469,115 B1
(45) Date of Patent: Oct. 22, 2002

(54) VIRTUALLY TELECHELIC SILYL-FUNCTIONAL POLYISOBUTYLENE

(75) Inventors: Rudolf Faust, Lexington; Savvas E. Hadjikyriacou, Lowell, both of MA (US); Aroop Kumar Roy; Toshio Suzuki, both of Midland, MI (US)

(73) Assignees: Dow Corning Corporation, Midland, MI (US); University of Massachusetts Lowell, Lowell, MA (US)

( * ) Notice: Subject to any disclaimer, the term of this patent is extended or adjusted under 35 U.S.C. 154(b) by 0 days.

(21) Appl. No.: 09/572,135

(22) Filed: May 16, 2000

(51) Int. Cl.$^7$ ................................................ C08F 4/00
(52) U.S. Cl. ...................................... 526/194; 526/279
(58) Field of Search .................................. 526/194, 279

(56) References Cited

U.S. PATENT DOCUMENTS

| | | | |
|---|---|---|---|
| 4,524,187 A | 6/1985 | Greco et al. | 525/332.1 |
| 4,829,130 A | 5/1989 | Licchelli et al. | 525/384 |
| 4,904,732 A | 2/1990 | Iwahara et al. | 525/100 |
| 6,051,657 A | 4/2000 | Faust et al. | 525/284 |
| 6,194,597 B1 * | 2/2001 | Faust et al. | 525/284 |

OTHER PUBLICATIONS

Journal of Organometallic Chemistry, 264 (1984) 127–133; Manuel et al., "Thermal Isomerization of 3–Silabicyclo [3.1.0]Hexanes: A New Route to Silacyclopentenes and Silacyclohexenes."
Journal of Organometallic Chemistry, 156 (1978), 55–64; Sivaram, "Organoaluminum Chemistry and its Application to the Initiation of Carbenium Ion Polymerization."
Advances in Polymer Science, vol. 28, 83–111 (1978); Kennedy et al., "Cationic Olefin Polymerization Using Alkyl Halide Alkylaluminum Initiator Systems."
Journal of the American Chemical Society, vol. 95, 6386–6390 (1973); Kennedy et al., "Alkylation of Tertiary Alkyl Halides with Trialkylaluminums."
Journal of Polymer Science: Polymer Chemistry Edition, vol. 17, 2129–2136 (1979); J. Ambrose et al., "Cationic Polymerization of Alpha–Methylstyrene from Olydienes."
Polymeric Materials Science and Engineering, vol. 72, 173–174 (1995); Wang et al., "Direct Initiaion in Carbocationic Polymerization."
Advances in Polymer Science, vol. 43, 3–50, (1982); Kennedy et al.,Carbocationic Synthesis and Characterization of Polyolefins with Si–H and Si–Cl Head Groups.

* cited by examiner

*Primary Examiner*—Bernard Lipman
(74) *Attorney, Agent, or Firm*—Alexander Weitz; Alan Zombeck

(57) ABSTRACT

A method for preparing a moisture-curable, virtually telechelic, silyl-functional polyisobutylene is disclosed, said method comprising reacting, in the presence of a Lewis acid,
(A) isobutylene;
(B) an initiator of the formula

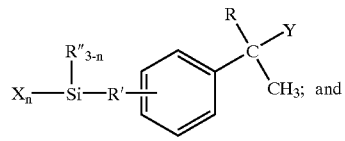

and (C) a styryl comonomer of the formula

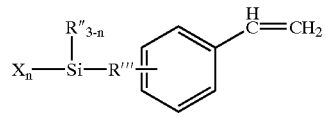

wherein R is selected from H or methyl group, R' is a divalent non-aromatic hydrocarbon group having 1 to 6 carbon atoms, R" is independently selected from alkyl groups having 1 to 10 carbon atoms or aryl groups having 6 to 10 carbon atoms, R'" is a divalent non-aromatic hydrocarbon group having 2 to 6 carbon atoms, X is independently a halogen group, Y is halogen and n is independently 1, 2 or 3.

20 Claims, No Drawings

VIRTUALLY TELECHELIC SILYL-FUNCTIONAL POLYISOBUTYLENE

FIELD OF THE INVENTION

The present invention relates to a method for preparing a room temperature vulcanizable polyisobutylene polymer. More particularly, the invention relates to a method for synthesizing a polyisobutylene having hydrolyzable silyl-functional groups positioned at or near molecular chain ends, said polymer being prepared by a living polymerization wherein isobutylene, a silyl-functional cationic initiator and a silyl-functional comonomer are reacted in the presence of a Lewis acid.

BACKGROUND OF THE INVENTION

Living anionic polymers are well known in the art but truly living cationic systems have only been developed more recently. By definition, termination and chain transfer rates are zero, or negligible, in such a living polymer so that the concentration of active centers remains approximately constant. Of particular commercial interest are living organic polymers which can be used to prepare telechelic oligomers and macromolecules having hydrolyzable silyl end groups since these can be used to formulate room temperature vulcanizable (RTV), moisture-curable sealants, caulks and adhesives, inter alia. Unlike the well known moisture-curable silicone RTVs, compositions based on polymers having a hydrocarbon backbone offer the advantage of low permeability, making them more suitable for gas barrier applications such as form-in-place gaskets, O-rings, rubber plugs/seals, and the like.

U.S. Pat. No. 4,829,130 to Licchelli et al. discloses a method for preparing silylated copolymers of isobutylene which are cross linkable upon exposure to moisture. In this case, isobutylene is copolymerized with a comonomer having a vinylic group attached to a silylalkyl group through a benzene ring connecting group. The product of this copolymerization is a polyisobutylene (PIB) having pendant silyl-functional groups along its main chain.

Likewise, U.S. Pat. No. 4,524,187 to Greco et al. teaches cross linkable polyisobutylene copolymers having pendant silyl functionality which is reactive with moisture. In this case, isobutylene is first reacted with a triene compound to form a copolymer having pendant vinyl groups, the latter then being silylated with a moisture-reactive hydridosilane or mercapto-functional silane.

Polymers having reactive silyl head groups were described by Kennedy et al. in *Advances in Polymer Science*, 43, 1–50 (1982). These workers discovered that initiators which included an SiCl or SiH group as well as a cationogenic moiety could be used to polymerize cationic systems such that the silicon-functional groups survived. The cationogenic moiety studied was the benzyl chloride group (i.e., —$C_6H_4$—$CH_2Cl$) wherein α-methylstyrene was polymerized in the presence of diethyl aluminum chloride as coinitiator. In this case, however, it was observed that the amount of —SiCl detected was only a small fraction of the theoretical, especially when more than one chlorine was present in the head group. Further, although these workers suggest that the SiCl groups may survive polymerization of isobutylene, they did not obtain quantitative confirmation thereof and did not demonstrate the new initiators in connection with this monomer. Thus, Kennedy et al. then turned to the investigation of systems having SiH terminal groups, such polymers being considered more promising intermediates which presented fewer experimental difficulties.

In copending application Ser. No. 292,333 filed on Apr. 15, 1999, we disclose the use of a novel class of compounds which, unlike the initiators taught by Kennedy et al., cited supra, can initiate cationic polymerization in a controlled manner to provide a living polymer having a silicon halide head group. This living polymer is prepared by reacting at least one cationically polymerizable monomer with the novel initiator, further described infra, in the presence of a Lewis acid. According to the above disclosure, the living cationic polymer may be further reacted with a coupling agent to provide a silyl-functional telechelic polymer. However, this method requires an exact stoichiometric amount of the coupling agent with respect to the living polymer chain, this often being difficult in large scale operations. Further, this method is relatively complicated and there is still a need for simpler means of synthesizing silyl-functional telechelic hydrocarbon polymers which can be readily cured by exposure to moisture.

SUMMARY OF THE INVENTION

It has now been discovered that a virtually telechelic, silyl-functional polyisobutylene can be prepared by reacting isobutylene, the above mentioned novel initiator, and a silyl-functional styryl comonomer in the presence of a Lewis acid.

The present invention, therefore, relates to a method comprising reacting, in the presence of a Lewis acid, (A) isobutylene;

(B) an initiator of the formula
and;

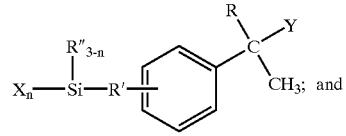

(C) a styryl comonomer of the formula

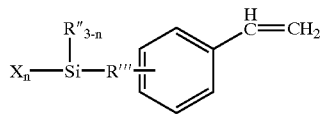

wherein R is selected from H or methyl group, R' is a divalent non-aromatic hydrocarbon group having 1 to 6 carbon atoms, R" is independently selected from alkyl groups having 1 to 10 carbon atoms or aryl groups having 6 to 10 carbon atoms, R'" is a divalent non-aromatic hydrocarbon group having 2 to 6 carbon atoms, X is independently a halogen group, Y is halogen and n is independently 1, 2 or 3.

The invention further relates to the virtually telechelic silyl-functional polymer prepared by the above method.

DETAILED DESCRIPTION OF THE INVENTION

Component (A) of the present invention is a monomer consisting essentially of isobutylene and may be either a substantially pure isobutylene (IB) monomer or a mixture of isobutylene with up to 20 mole percent of at least one monomer selected from 1-butene, 2-butene, isoprene, styrene, α-methylstyrene or p-methylstyrene. These mixtures having a minor proportion of the above mentioned monomers are also referred to as "isobutylene" for the purposes herein. Preferably, component (A) is substantially pure (i.e., distilled) IB.

The reactive silyl-functional initiator (B) of the present invention is represented by the formula

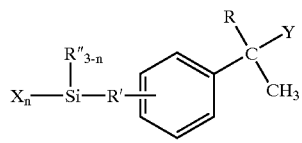

(i)

wherein R is selected from H or methyl group, R' is a divalent non-aromatic hydrocarbon group having 1 to 6 carbon atoms, R" is selected from alkyl groups having 1 to 10 carbon atoms or aryl groups having 6 to 10 carbon atoms, X is halogen, Y is halogen and n is 1, 2 or 3. Specific examples of R" include methyl, ethyl, propyl, isopropyl, n-butyl, isobutyl, n-octyl, 2-ethylhexyl, n-nonyl, n-decyl, phenyl and tolyl, methyl being preferred. The group R' is exemplified by —CH$_2$—, —CH$_2$—CH$_2$—, —CH$_2$CH$_2$CH$_2$—, —CH$_2$—C(Me)$_2$— and —CH$_2$=CH$_2$—, and is preferably —CH$_2$CH(Me)—, wherein Me hereinafter represents a methyl group. Specific examples of X and Y are fluorine, chlorine, bromine and iodine. Further, the moieties attached to the benzene ring of formula (i) may be in ortho, meta or para positions with respect to one another, the latter two isomers being preferred. Preferably, X and Y are chlorine and n is 2 or 3.

In a highly preferred embodiment of the instant method, the initiator has the formula

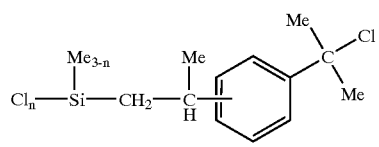

(ii)

wherein n is 2 or 3.

The initiators of the present invention can be prepared by first carrying out a hydrosilation reaction between a dialkenyl benzene species (or an alkenyl-alkynyl benzene species) and a halosilane, as illustrated below for a preferred system wherein R' is —CH$_2$CH(Me)—:

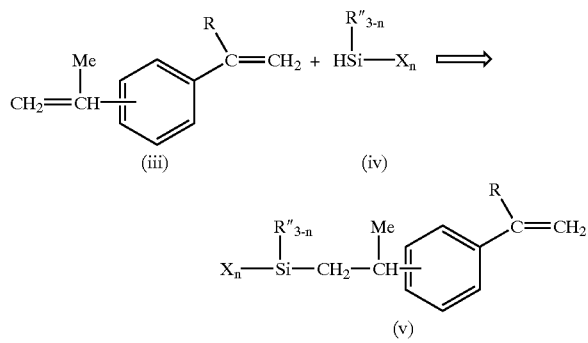

in which R, R", X and n are as defined above in connection with formula (i). In the above hydrosilation reaction, the molar ratio of component (iii) to component (iv) can be 0.3:1 to 10:1 but is preferably more than 1:1. More preferably, the ratio is 1:1 to 3:1. After the hydrosilation reaction, isolation of the desired product (v) by a suitable method, such as fractional distillation, is recommended. In this case, it is highly preferred that a radical scavenger, such as phenothiazine, be added to the mixture to prevent polymerization of the product and starting materials.

Suitable catalysts for the hydrosilation reaction are platinum black, platinum metal on various solid supports (e.g., carbon), chloroplatinic acid, alcohol solutions of chloroplatinic acid, and complexes of chloroplatinic acid with liquid ethylenically unsaturated compounds such as olefins and organopolysiloxanes containing ethylenically unsaturated hydrocarbon radicals bonded to silicon. Preferred catalysts include a platinum complex catalyst produced by reacting chloroplatinic acid and divinyltetramethyldisiloxane, prepared according to U.S. Pat. No. 3,419,593 to Willing and a neutralized complex of platinous chloride and divinyltetramethyldisiloxane, prepared according to U.S. Pat. No. 5,175,325 to Brown et al., these patents being hereby incorporated by reference. Most preferably, this catalyst is a neutralized complex of platinous chloride and divinyltetramethyldisiloxane. For this synthesis, the hydrosilation catalyst is generally employed at a level equivalent to a platinum concentration of from 0.1 to 1,000 parts by weight of platinum metal, preferably from to 1 to 100 parts by weight of platinum metal, per million weight parts (ppm) of the unsaturated component (iii).

After the hydrosilation reaction is carried out, synthesis of the initiator according to the present invention may be completed by hydrohalogenating structure (v). This reaction is again illustrated for the case in which R' is —CH$_2$CH(Me)— and Y is Cl:

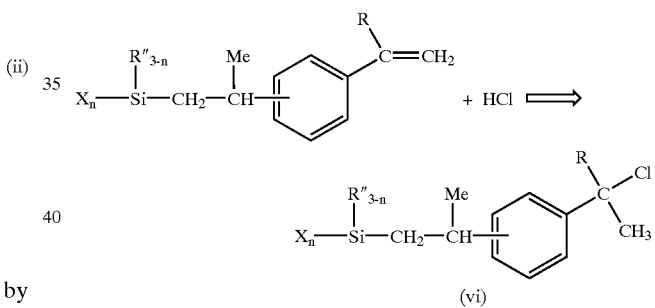

(vi)

wherein R, R", X and n have their previously defined meanings. In the above hydrohalogenation reaction, the acid is typically added in excess.

Alternatively, the initiator may be prepared by a conventional Grignard synthesis (e.g., dicumyl chloride can be reacted with Mg followed by reaction with MeSiCl$_3$).

The styryl comonomer (C) has the formula

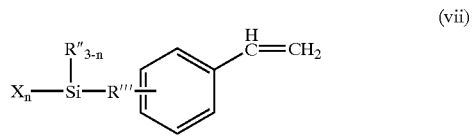

(vii)

wherein R", X and n are as defined above for component (B) and wherein each may be the same or different from the corresponding selection in (B). In formula (vii), R''' is a divalent, non-aromatic hydrocarbon group having 2 to 6 carbon atoms. Again, the moieties attached to the benzene ring of formula (vii) may be in ortho, meta or para positions with respect to one another, the latter two isomers being preferred. It is preferred that R" is selected from methyl, ethyl or phenyl, X is chlorine, and n is 2 or 3. A particularly preferred styryl comonomer has the formula

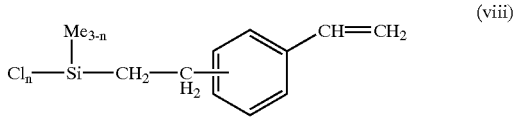

wherein n is 2 or 3.

The styryl comonomer (C) is known in the art and may be prepared by a hydrosilation reaction between a vinylalkenyl benzene and the corresponding halosilane in the presence of a platinum catalyst, followed by separation by distillation.

The Lewis acid, employed as a co-initiator in the present method, is of the type known to catalyze cationic living polymerization. Examples of such Lewis acids include $BZ_3$, $TiZ_4$, $AlZ_3$, $SnZ_4$ and $ZnZ_2$, inter alia, wherein Z is independently selected from the group consisting of halogen, alkoxy having 1 to 4 carbon atoms and alkyl having 1 to 4 carbon atoms. Preferably Z is halogen, most preferably chlorine. Of course, those skilled in the art will recognize that a compound such as $TiZ_4$ in which all of the Z groups are alkyl groups is not a useful catalyst for cationic living polymerization and such compounds are not contemplated herein. The interested reader is referred to the article by Matyjaszewski and Pugh in *Cationic Polymerization Mechanism, Synthesis and Applications*, Matyjaszewski, Ed.; Marcel Dekker, New York (1996), for a review of suitable Lewis acids. Preferably, the Lewis acid is selected from $TiCl_4$, $BCl_3$, $Me_2AlCl$ and $Me_2BCl$.

In order to prepare a virtually telechelic, silyl-functional polyisobutylene of the invention, components (A) through (C) are reacted in the presence of the Lewis acid, the reaction being carried out either in a sequential manner or in a random manner. For the purposes of the present invention, the term "virtually telechelic" denotes a polymer wherein the functional silyl groups do not necessarily reside at both terminal positions, as would be the case for a truly telechelic system. Rather, a functional silyl group derived from initiator (B) is located at a first terminal position (head) while, on average, a functional silyl group derived from comonomer (C) resides at or near the second terminal position (tail). Thus, the functional silyl group derived from comonomer (C) may be truly terminal or it may be, e.g., in a penultimate position or in a third, fourth or fifth position from the second terminus. Further, two or more of the latter functional units may congregate near the second terminus, this being controlled by the amount of component (C) used, as determined by routine experimentation.

In a first embodiment (sequential copolymerization mode), a monomer consisting essentially of isobutylene is polymerized with initiator (B) in the presence of a Lewis acid under a dry, inert atmosphere to provide a living cationic system. A Lewis base, such as pyridine or its derivatives, such as 2,6-ditert-butyl-pyridine (DTBP) or lutidine, is preferably included in this polymerization reaction in order to prevent initiation by protic impurities. Such cationic living polymerizations are well known in the art, including typical reaction conditions and proportions of the monomer, initiator, Lewis acid, etc. This polymerization is preferably run in a dry organic solvent solution (e.g., hexane, methylene chloride, methyl chloride, toluene, and combinations thereof). Of course, these conditions will vary according to the particular ingredients under consideration and doptimization of conditions and proportions needed to obtain a particular living polymer having a desired molecular weight can be achieved through routine experimentation by those skilled in the art. For example, the interested reader is directed to the chapter by Sawamoto in *Cationic Polymerization Mechanism, Synthesis and Applications*, Matyjaszewski, Ed.; Marcel Dekker, New York (1996) and the text by Kennedy and Ivan entitled *Designed Polymers by Carbocationic Macromolecular Engineering: Theory and Practice* published by Hanser (1992).

When the above described polymerization procedure is deemed complete, preferably when monomer conversion is at least 98%, the resulting living polymer is further reacted with styryl comonomer (C). Component (C) is preferably employed at a level of 1 to 20 times the molar concentration of initiator (B), more preferably 3 to 8 times the latter concentration. This reaction is preferably carried out at similar temperatures and in a similar solvent environment as described in connection with the preparation of the living polymer. The product of this sequential copolymerization is a virtually telechelic polymer having a halosilyl-containing group of the formula

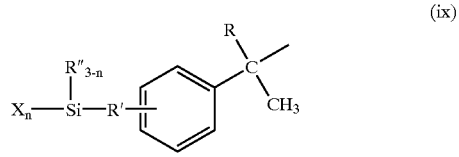

derived from initiator (B) at one terminus (head) and a halosilyl-containing group of the formula

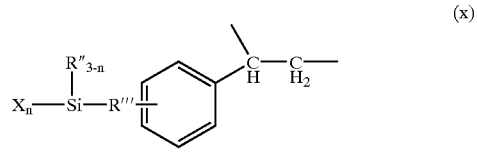

at, or near, the other terminal position (tail), wherein R, R', R", R''', X and n are as defined above.

In a preferred version of the first embodiment, a monomer of substantially pure isobutylene is reacted with an initiator according to formula (ii) in the presence of TiCl4. This reaction is carried out in a solvent, preferably a combination of methyl chloride and hexanes in a volume ratio of about 60/40 to 40/60, as well as in the presence of a Lewis base, such as DTBP, under dry conditions and at a temperature of −100° C. to 0° C., preferably −80° C. to −600° C. Preferably, the order of addition is solvent, Lewis base, Lewis acid, initiator and monomer. The concentrations of the initiator and $TiCl_4$ are preferably about $10^{-3}$ to $10^{-1}$ molar (M) and $10^{-3}$ to $10^{-2}$M, respectively, based on the total solution, while the molar content of DTBP is adjusted to be equal to or greater than that of any protic impurity. After the above living polymerization is essentially complete, the comonomer according to formula (viii) is preferably added at a level of about 1.5 to 10 times that of the initiator and allowed to react for a period of about 1 to 2 hours.

In a second embodiment (random copolymerization mode), a monomer consisting essentially of isobutylene monomer, initiator (B) and styryl comonomer (C) are reacted together in the presence of a Lewis acid to provide the virtually telechelic polymer. In this case, the resulting polymer is less "telechelic" in that functional silyl groups derived from comonomer (C) are less likely to reside as close to the tail as in the first embodiment. The proportions of the components, reaction temperatures and preferred values employed in this embodiment are essentially identical with those described in connection with the sequential mode, supra. However, in this case, components (A) through (C) are first mixed, preferably in solution, and the Lewis acid is then added to start the polymerization. This random copolymerization mode is preferred in view of its simplicity, even though it does not result in a product which is as close to telechelic as prepared by the sequential mode.

In the instant method, whether sequential or random, the halosilyl functionality of the product polymers is preferably converted to alkoxysilyl by reacting the polymer with an alcohol. During such an alcoholysis, the halogen groups on silicon are replaced by the corresponding alkoxy functionality. This reaction must be conducted under dry conditions so as not to prematurely hydrolyze either halogen or alkoxy groups. Typically, the reaction is carried out by adding the alcohol, which preferably has 1 to 4 carbon atoms, to the above described halosilyl-functional polymer solution at −80 to 60° C., an excess of 500 to 2,000% of the alcohol over the stoichiometric amount being preferred. The final alkoxysilyl-functional polymer may then be isolated from the reaction solution by conventional means, such as precipitation with a non-solvent.

The reactive silyl-functional virtually telechelic polymers of the present invention can be cured by exposure to moisture and can therefore be employed as base polymers in the formulation of sealants, adhesives and coatings when combined with the appropriate filler, plasticizers and catalysts, inter alia. Those skilled in the art will, of course, appreciate that at least one crosslinker would be necessary to obtain a cured system when there is only one reactive group on silicon (e.g., when n=1 in formulas ix and x). When cured, these formulated compositions can be used as form-in-place gaskets, seals for insulating glass, and the like.

EXAMPLES

The following examples are presented to further illustrate the method of this invention, but are not to be construed as limiting the invention, which is delineated in the appended claims. All parts and percentages in the examples are on a weight basis and all measurements were obtained at room temperature (approximately 20° C.) unless indicated to the contrary.

Example 1

Preparation of 3-(1-Dichloromethylsilyl-2-propyl) cumyl Chloride (DPCC)

A 250 ml three neck round bottom reaction flask equipped with a thermometer, a condenser, a magnetic stirring bar, an addition funnel and argon gas inlet was charged with 60 ml of 1,3-diisopropenylbenzene (0.35 mole). This was followed by the addition (under argon) of 0.2 ml of a 10% solution of a platinum divinyldisiloxane complex in hexanes. This complex was SIP 6830.0 obtained from Gelest (Tullytown, Pa.) and contained 3–3.5% Pt in vinyl terminated polydimethylsiloxane. After injection of the catalyst, the argon inlet was replaced by a drying tube that contained Drierite™.

The reaction flask was warmed to 40° C. in an oil bath and a dropwise feed of $CH_3Cl_2SiH$ (30 ml; 0.29 mole) from the addition funnel was started.

The reaction temperature was kept between 40° C. and 50° C. during feeding by adjusting the rate of addition of $CH_3Cl_2SiH$ and heat to the oil bath. After the addition, the temperature was kept at the above level for another 3 hours.

The flask was allowed to cool to room temperature and the addition funnel, the drying tube and the thermometer were removed and the condenser was replaced by a distillation head and argon inlet. Excess 1,3-diisopropenylbenzene was distilled out, followed by the distillation of the expected material 1-isopropenyl-3-(1-dichloromethylsimethyl)ethyl-benzene (IDEB)

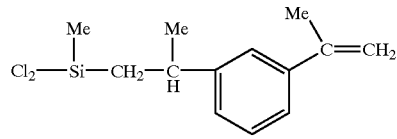

the structure of which was confirmed by $^1H$ NMR (nuclear magnetic resonance).

The above prepared IDEB (5 ml) was dissolved in 100 ml of dried and distilled $CH_2Cl_2$ and cooled to 0° C. Dry HCl, generated by the reaction of NaCl and $H_2SO_4$, was bubbled through the solution for 5 hours. The solution was allowed to warm to room temperature and excess HCl was allowed to escape. Most of the solvent was evaporated on a Rotavap™ and the last traces were removed by attaching a vacuum pump.

Characterization by $^1H$ NMR spectroscopy confirmed quantitative hydrochlorination to yield 3-(1-dichloromethylsilyl-2-propyl)cumyl chloride (DPCC) having the structure

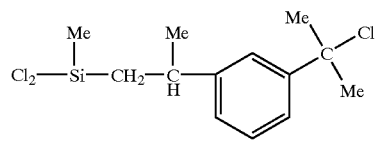

Example 2

Preparation of (2-Dichloromethylsilyl-ethyl)styrene (DSiSt)

A 500 ml three-neck, round bottom flask equipped with a magnetic stirrer, a condenser and an addition funnel was charged with 60 ml (0.337 mole) of divinylbenzene (Aldrich Chemical Co., Milwaukee, Wi; #41,456-5; mixture of 80% m- and p- isomers and containing 20% ethylvinylbenzene) under an argon atmosphere and at room temperature (RT). While stirring, 200 ml of distilled and dried hexanes were added followed by 0.5 ml of the above described platinum catalyst solution (#SIP6830.0 from Gelest). Dichloromethylsilane (39.0 ml; 0.371 mole) was placed in the addition funnel, the argon supply was disrupted and a drying tube was attached to the system. The dichloromethylsilane was added dropwise at room temperature and the reaction was monitored by $^1H$ NMR spectroscopy. After 48 hours, it was determined that hydrosilation was complete and the addition funnel and condenser were replaced by a distillation head and the crude product was purified by fractional distillation. The desired product was obtained as a mixture, 77% thereof corresponding to a combination of meta- and para (2-dichloromethylsilyl-ethyl)-styrene (DSiSt) of the formula

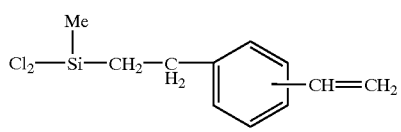

and 23% of the by-product (2-dichloromethylsilyl-ethyl)-ethyl-benzene.

Example 3

Sequential Polymerization of Isobutylene (IB) Using DPCC Initiator and DSiSt Comonomer A 250 ml reaction flask equipped with an overhead stirrer was charged with 16.7 ml of hexanes measured at RT and the contents cooled to −80° C. While stirring, 23.6 ml of $CH_3Cl$ was added followed by the addition of a cold solution (−80° C.) of 0.06 ml of 2,6-ditert-butyl-pyridine (DTBP) in 10 ml hexanes (measured at RT). A solution of 0.78 ml of $TiCl_4$ in 10 ml hexanes (RT) and 10 ml $CH_3Cl$ was then added and allowed to mix for 5 minutes (added at −80° C.). A cold solution (−80° C.) of the initiator DPCC. prepared in Example 1 (0.5529 g in 20 ml hexanes measured at RT) was introduced followed by the immediate addition of 4.9 ml of IB. Total volume for 1IB polymerization was 89.3 ml (at −80° C.). The molar concentrations of the reactants were as follows (based on the total solution):

$$DPCC=2.0\times10^{-2}M;\ DTBP=3\times10^{-3}M;\ IB=0.71\ M;\ TiCl_4=8\times10^{-2}M$$

After 40 minutes of polymerization at −80° C., 20 ml of the above mixture was transferred to each of four culture tubes. A stock solution of the DSiSt was prepared by mixing 1.82 ml of the 77% DSiSt obtained in Example 2 with 5.6 ml hexanes at room temperature and 3.4 ml of $CH_3Cl$ (−80° C.) was added to each culture tube, as shown in Table 1, to provide the indicated final concentrations of DSiSt isomers.

TABLE 1

| Tube | DSiSt stock soln. added | Concentration of DSiSt |
| --- | --- | --- |
| Tube #1 | none (control) | 0 |
| Tube #2 | 1.0 ml | $3.0 \times 10^{-2}$M |
| Tube #3 | 2.0 ml | $6.0 \times 10^{-2}$M |
| Tube #4 | 3.0 ml | $9.0 \times 10^{-2}$M |

Tube #1 served as the control and the contents thereof were quenched with excess dry methanol while tubes #2, #3 and #4 were allowed to react for an additional hour after the introduction of the DSiSt. These samples were then also quenched with excess methanol and the resulting methoxysilyl-functional polymers were isolated by precipitation from hexanes/methanol (1.0:1.5 ratio),under nitrogen. Analysis by $^1H$ NMR indicated close to quantitative (i.e., >80%) capping of the PIB chain ends was achieved for tube #4, wherein the DSiSt concentration was 4.5 time that of the DPCC. This polymer had a number average molecular weight (Mn) of 2,600 (Gel Permeation Chromatography using universal calibration) and a small amount of PIB-chloride chain ends (i.e., —$CH_2C(Me_3)_2Cl$ ends; peak at 2.0 ppm) was still observed in the NMR spectrum. The NMR spectrum further showed that more than 80% of the polyisobutylene chain ends were capped when the concentration of DSiSt was $9.0\times10^{-2}$ M (tube #4), while somewhat lower capping was observed for tubes #2 and #3 (about 60% capping).

Example 4

Random Copolymerization of IB and DSiSt Initiated by DPCC

Each of four culture tubes was charged with 9.3 ml of hexanes and 5.6 ml of $CH_3Cl$. One (1.0) ml of a stock solution prepared by dissolving 0.13 ml of DTBP in 11.2 ml of hexanes was added. This was followed by the addition of 2.0 ml of a solution of DPCC (0.5534 g in 4.5 ml hexanes and 4.5 ml $CH_3Cl$). 1B (1.1 ml) was delivered to each culture tube (all measured at −80° C.). A set quantity of a stock solution, prepared by dissolving 1.82 ml of the 77% DSiSt obtained in Example 2 in 8.4 ml of $CH_3Cl$, was delivered to the culture tubes, as indicated in Table 2.

TABLE 2

| Tube | DSiSt stock soln. added | Concentration of DSiSt |
| --- | --- | --- |
| Tube #1 | none (control) | 0 |
| Tube #2 | 1.0 ml | $3.0 \times 10^{-2}$M |
| Tube #3 | 2.0 ml | $6.0 \times 10^{-2}$M |
| Tube #4 | 3.0 ml | $9.0 \times 10^{-2}$M |

The polymerizations were started by the addition of 2.0 ml of a stock solution prepared by mixing 1.76 ml of $TiCl_4$ with 9.5 ml of hexanes and 10 ml of $CH_3Cl$. Polymerization time was 2 hours at −80° C. in each case and the final concentrations of reactants during polymerization were as follows: DPCC.=$2.0\times10^{-2}$ M; DTBP=$3\times10^{-3}$ M; IB=0.71 M; TiCl=$8\times10^{-2}$ M. The resulting SiCl-functional polymers were quenched with excess dry methanol, isolated and purified by re-precipitation from hexanes/methanol (1.0: 1.5 ratio) to form the corresponding methoxy-functional polymers. The control (tube #1) resulted in $M_n$=2,900 and quantitative conversion of both monomers (i.e., the IB and the DSiSt) was observed within 2 hours in each case. The $^1H$ NMR spectrum of the polymer obtained in tube #2, wherein the concentration of DSiSt was 1.5 time that of the DPCC, clearly indicated that the terminal and/or the penultimate unit of the polymer was derived from the styryl comonomer DSiSt since PIB-chloride chain ends (i.e., —$CH_2C(Me_2)Cl$) were not detected.

Example 5

Crosslinking of the Random Copolymer of Example 4

Into a 20 ml vial there was placed 0.3355 g of the methoxy-functional polymer prepared in Example 4 (tube #4) and 1 drop of water was added and stirred therein. An organotin catalyst (0.0412 g of tin(II)-2-ethylhexanoate) was added and mixed in to give a white mass that was allowed to stand for 72 hours. Twenty ml of hexanes was added and the vial was closed and the contents stirred magnetically for 45 hours. The contents of the vial were filtered and the filtrate evaporated on a Rotavap™, whereupon 0.0187 g of material representing 5.5% of the total, was extracted, indicating that cure had taken place. $^1H$ NMR characterization of the extract revealed that it contained 98.5% catalyst and only 1.5% polyisobutylene for which no chain ends could be identified.

That which is claimed is:

1. A method for preparing a virtually telechelic silyl-functional polyisobutylene, said method comprising reacting, in the presence of a Lewis acid, (A) a monomer consisting essentially of isobutylene;

(B) an initiator of the formula

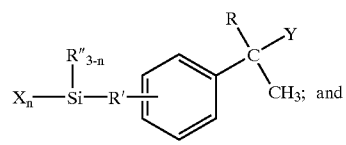

(C) a styryl comonomer of the formula

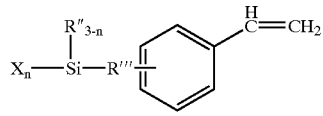

wherein R is selected from H or methyl group, R' is a divalent non-aromatic hydrocarbon group having 1 to 6 carbon atoms, R" is independently selected from alkyl groups having 1 to 10 carbon atoms or aryl groups having 6 to 10 carbon atoms, R'" is a divalent non-aromatic hydrocarbon group having 2 to 6 carbon atoms, X is independently a halogen group, Y is halogen and n is independently 1, 2 or 3.

2. The method according to claim 1, wherein the reaction takes place in the presence of an organic solvent.

3. The method according to claim 2, wherein said initiator has the formula

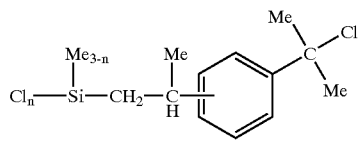

in which Me is methyl and n is 1, 2 or 3.

4. The method according to claim 2, wherein said styryl comonomer has the formula

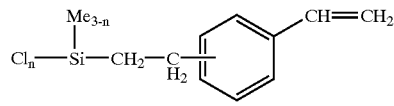

in which Me is methyl and n is 1, 2 or 3.

5. The method according to claim 2, wherein said Lewis acid is $TiCl_4$.

6. The method according to claim 2, further comprising reacting said virtually telechelic silyl-functional polyisobutylene with an alcohol.

7. The method according to claim 2, wherein said initiator has the formula

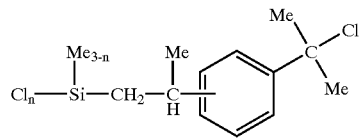

and said styryl comonomer has the formula

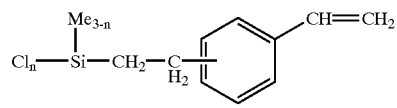

in which Me is methyl and each n has a value of 2 or 3.

8. The method according to claim 7, wherein said Lewis acid is $TiCl_4$.

9. The method according to claim 8, further comprising reacting said virtually telechelic silyl-functional polyisobutylene with methanol.

10. The method according to claim 7, further comprising reacting said virtually telechelic silyl-functional polyisobutylene with an alcohol having 1 to 4 carbon atoms.

11. A polymer prepared according to the method of claim 1.

12. A polymer prepared according to the method of claim 2.

13. A polymer prepared according to the method of claim 3.

14. A polymer prepared according to the method of claim 4.

15. A polymer prepared according to the method of claim 5.

16. A polymer prepared according to the method of claim 6.

17. A polymer prepared according to the method of claim 7.

18. A polymer prepared according to the method of claim 8.

19. A polymer prepared according to the method of claim 9.

20. A polymer prepared according to the method of claim 10.

* * * * *